US008502840B2

(12) United States Patent
Lee et al.

(10) Patent No.: US 8,502,840 B2
(45) Date of Patent: Aug. 6, 2013

(54) APPARATUS FOR DRIVING A DISPLAY PANEL WITH COMPENSATION FOR HEAT CAUSED BY PROXIMITY TO LIGHT SOURCE, AND METHOD THEREOF

(75) Inventors: Hyoung-Rae Lee, Asan-si (KR); Gyu-Su Lee, Asan-si (KR); Min-Sik Um, Jeonju-si (KR); Sang-Won Lee, Asan-si (KR); Duk-Hwan Kang, Incheon (KR)

(73) Assignee: Samsung Display Co., Ltd., Yongin (KR)

( * ) Notice: Subject to any disclaimer, the term of this patent is extended or adjusted under 35 U.S.C. 154(b) by 531 days.

(21) Appl. No.: 12/856,108

(22) Filed: Aug. 13, 2010

(65) Prior Publication Data

US 2011/0175954 A1 Jul. 21, 2011

(30) Foreign Application Priority Data

Jan. 18, 2010 (KR) ........................ 10-2010-0004393

(51) Int. Cl.
*G09G 5/10* (2006.01)
*G02F 1/133* (2006.01)
*F21V 7/04* (2006.01)

(52) U.S. Cl.
USPC .............................. 345/690; 362/600; 349/20

(58) Field of Classification Search
USPC ........... 345/204–215, 690–699; 362/600–634
See application file for complete search history.

(56) References Cited

U.S. PATENT DOCUMENTS

| | | | | |
|---|---|---|---|---|
| 5,179,371 | A * | 1/1993 | Yamazaki | 345/93 |
| 8,284,348 | B2 * | 10/2012 | Kobayashi et al. | 349/65 |
| 2006/0203204 | A1 * | 9/2006 | Yu | 353/52 |
| 2007/0176887 | A1 * | 8/2007 | Uehara et al. | 345/102 |
| 2009/0284515 | A1 * | 11/2009 | Tsuge | 345/211 |
| 2010/0079429 | A1 * | 4/2010 | Hirose et al. | 345/209 |
| 2010/0321414 | A1 * | 12/2010 | Muroi et al. | 345/690 |
| 2011/0025730 | A1 * | 2/2011 | Ajichi | 345/690 |
| 2011/0063330 | A1 * | 3/2011 | Bae et al. | 345/690 |
| 2011/0292096 | A1 * | 12/2011 | Ohhara | 345/690 |
| 2012/0229733 | A1 * | 9/2012 | Ishii et al. | 349/72 |

* cited by examiner

*Primary Examiner* — Dwayne Bost
*Assistant Examiner* — Larry Sternbane
(74) *Attorney, Agent, or Firm* — H.C. Park & Associates, PLC

(57) ABSTRACT

A driving unit of a display panel includes a control part, a gate driving part, a grayscale compensating part, and a data driving part. The control part provides a control signal and a grayscale signal. The gate driving part provides a gate signal to the display panel. The display panel is divided into a plurality of blocks according to a distance from a light source to each of the blocks. The grayscale compensating part outputs a compensating signal of an n-th frame using look-up tables, and the look-up tables respectively correspond to the blocks of the display panel. The data driving part converts the compensating signal of the n-th frame into a grayscale voltage and provides the grayscale voltage to the display panel. Accordingly, the driving unit of the display panel may improve a response speed of liquid crystals and display quality.

20 Claims, 7 Drawing Sheets

APPARATUS FOR DRIVING A DISPLAY PANEL WITH COMPENSATION FOR HEAT CAUSED BY PROXIMITY TO LIGHT SOURCE, AND METHOD THEREOF

CROSS REFERENCE TO RELATED APPLICATION

This application claims priority from and the benefit of Korean Patent Application No. 10-2010-4393, filed on Jan. 18, 2010, which is hereby incorporated by reference for all purposes as if fully set forth herein.

BACKGROUND OF THE INVENTION

1. Field of the Invention

Exemplary embodiments of the present invention relate to a method of driving a display panel, a driving unit for performing the method, and a display apparatus having the driving unit. More particularly, exemplary embodiments of the present invention relate to a method of driving a display panel capable of improving response speed, a driving unit for performing the method, and a display apparatus having the driving unit.

2. Discussion of the Background

Generally, a liquid crystal display (LCD) apparatus includes an LCD panel and a backlight assembly providing light to the LCD panel. The LCD panel includes an array substrate, an opposite substrate, and liquid crystals disposed between the array substrate and the opposite substrate. The LCD panel controls an intensity of an electric field applied to the liquid crystals to control an amount of transmitted light in order to display an image.

The LCD apparatus may have various characteristics such as smaller thickness, lighter weight, lower power consumption, and higher resolution than other types of display apparatuses, and, thus, the LCD apparatus may be widely used in devices such as monitors, laptop computers, desktop computers, and cellular phones. In addition, as the LCD panel becomes bigger, the LCD panel may be used in televisions. However, for application in televisions to display video, the response speed of the liquid crystals is an important factor in evaluating the performance of the LCD panel.

Methods for improving the response speed of the liquid crystals may include application of high-speed liquid crystals, alteration of a cell structure of a thin-film transistor (TFT), an overdriving method, and related methods. For example, the overdriving method may include dynamic capacitance compensation (DCC) driving.

DCC driving compares previous frame data to present frame data and overdrives the present frame data so that the response speed of the liquid crystals may be effectively enhanced.

In DCC driving, the amount of overdriving between grayscales may be hard to implement in a linear scale due to properties of the liquid crystals so a look-up table based on measured data may be generally used. In the look-up table, a compensating signal of the present frame may be mapped to corresponding data signals of the previous and present frames.

However, the backlight assembly may be disposed on at least one surface of a light guide plate instead of being entirely disposed under the LCD panel. Examples of the surfaces include a side surface, upper and lower side surfaces, and right and left side surfaces. In this case, the liquid crystal temperature may be changed according to its position within the LCD panel.

Accordingly, the display quality may be decreased due to an imbalance of the response speed according to the temperature variation of the liquid crystals. For example, blurring or displaying a wrong color may occur at various positions of the LCD panel.

SUMMARY OF THE INVENTION

Exemplary embodiments of the present invention provide a method of driving a display panel that may improve a response speed of liquid crystals and display quality.

Additional features of the invention will be set forth in the description that follows and, in part, will be apparent from the description or may be learned by practice of the invention.

An exemplary embodiment of the present invention discloses a method of driving a display panel that comprises providing a control signal and a grayscale signal, the control signal comprising a gate clock signal and a data clock signal, providing a gate signal to the display panel based on the gate clock signal, outputting a compensating signal of an n-th frame using look-up tables. The display panel is divided into a plurality of blocks according to a distance between the blocks and a light source, and the look-up tables respectively correspond to the blocks of the display panel with 'n' being a natural number. The method also includes converting the compensating signal of the n-th frame into a grayscale voltage and providing the grayscale voltage to the display panel.

An exemplary embodiment of the present invention also discloses a driving unit of a display panel that comprises a control part to provide a control signal and a grayscale signal, the control signal comprising a gate clock signal and a data clock signal; a gate driving part to provide a gate signal to the display panel based on the gate clock signal; a grayscale compensating part to output a compensating signal of an n-th frame using look-up tables, the display panel being divided into a plurality of blocks according to a distance between the blocks and a light source, the look-up tables respectively corresponding to the blocks of the display panel, and 'n' being a natural number; and a data driving part to convert the compensating signal of the n-th frame into a grayscale voltage and to provide the grayscale voltage to the display panel.

An exemplary embodiment of the present invention further discloses a display apparatus that comprises a display panel comprising gate lines and data lines crossing each other; a light source generating light to the display panel; a control part to provide a control signal and a grayscale signal, the control signal comprising a gate clock signal and a data clock signal; a gate driving part to provide a gate signal to the gate lines based on the gate clock signal; a grayscale compensating part to output a compensating signal of an n-th frame using look-up tables, the display panel being divided into a plurality of blocks according to a distance between the blocks and the light source, the look-up tables respectively corresponding to the blocks of the display panel, and 'n' being a natural number; and a data driving part to convert the compensating signal of the n-th frame into a grayscale voltage and to provide the grayscale voltage to the data line It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
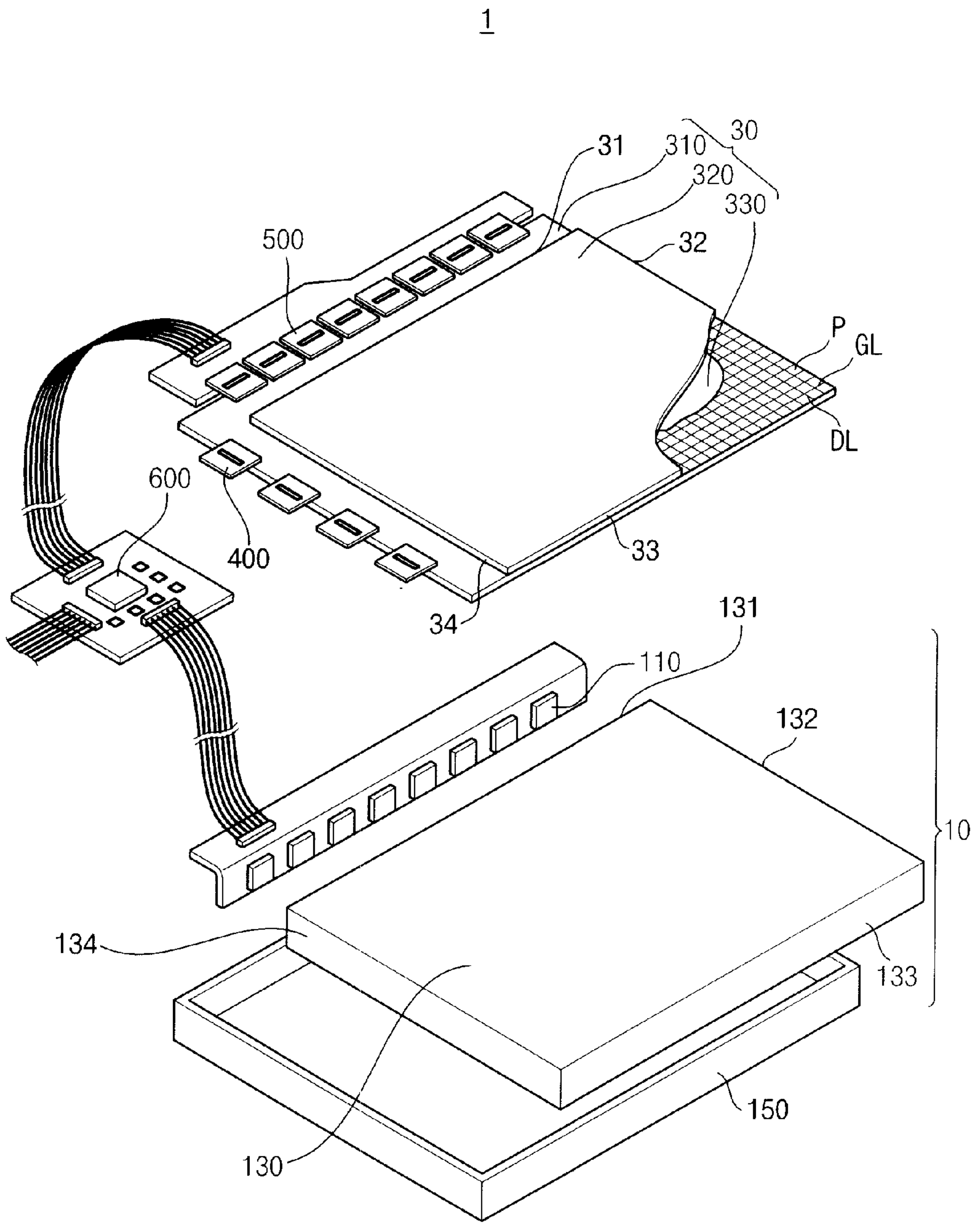
FIG. 1 is a perspective view of a display apparatus according to an exemplary embodiment of the present invention.

The present invention is described more fully hereinafter with reference to the accompanying drawings in which embodiments of the invention are shown. The invention may, however, be embodied in many different forms and should not be construed as limited to the embodiments set forth herein. Rather, these embodiments are provided so that this disclosure is thorough and will fully convey the scope of the invention to those skilled in the art. In the drawings, the sizes and relative sizes of layers and regions may be exaggerated for clarity. Like reference numerals in the drawings denote like elements.

It will be understood that when an element or layer is referred to as being “on,” “connected to,” or “coupled to” another element or layer, it can be directly on, directly connected, or directly coupled to the other element or layer, or intervening elements or layers may be present. In contrast, when an element is referred to as being “directly on,” “directly connected to,” or “directly coupled to” another element or layer, there are no intervening elements or layers present. As used herein, the term “and/or” includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as “beneath,” “below,” “lower,” “above,” “upper,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional views that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions shown herein but are to include deviations in shapes that result, for example, from manufacturing. For example, an implanted region shown as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions shown in the figures are schematic in nature and their shapes are not intended to show the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
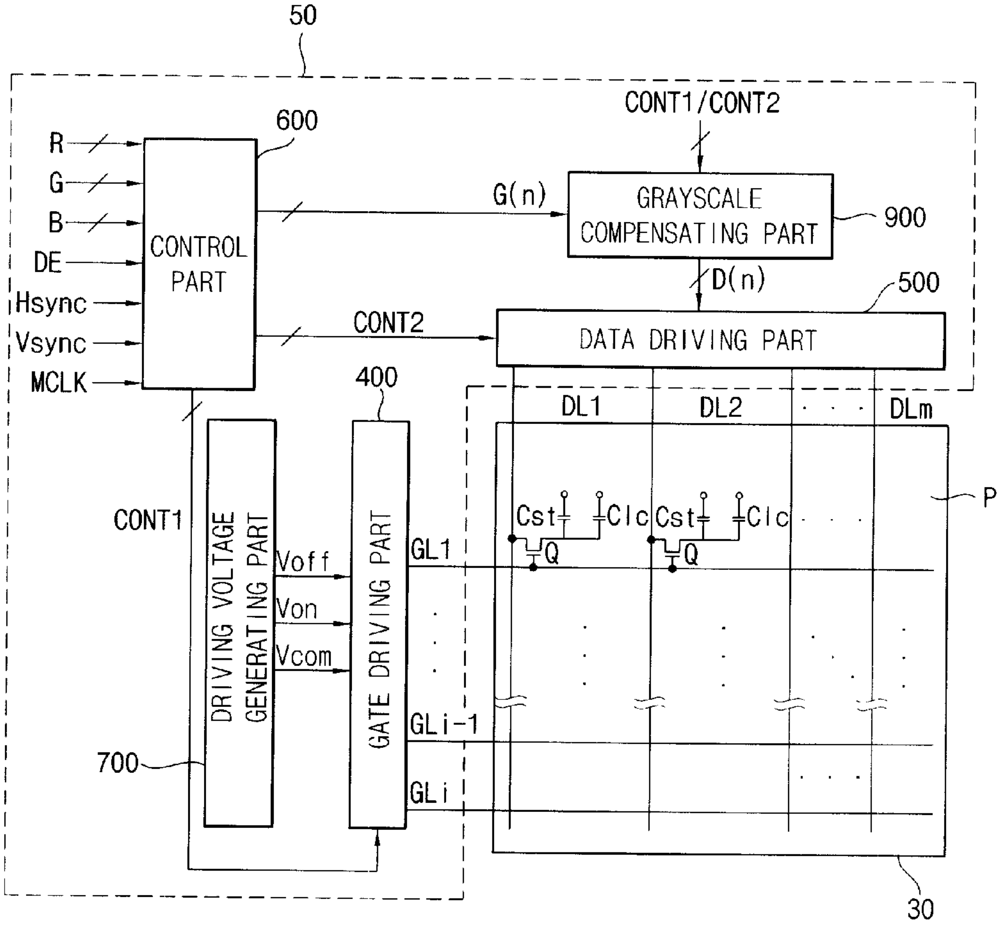
FIG. 2 is a block diagram of a driving unit of the display panel shown in FIG. 1.
Figure 3:
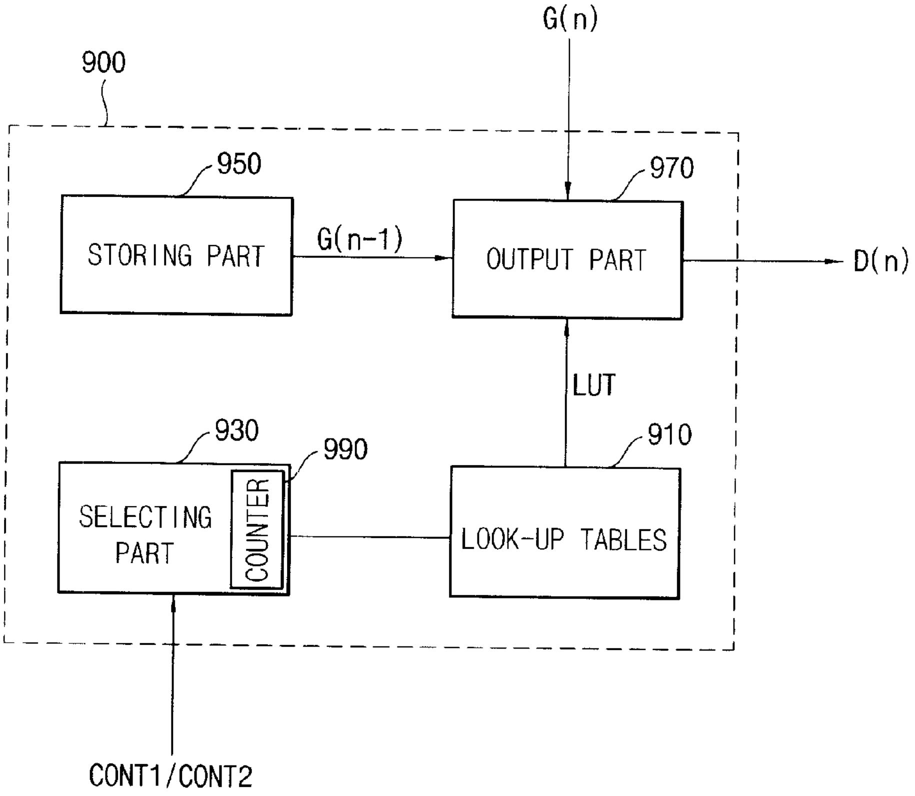
FIG. 3 is a block diagram of the grayscale compensating part of FIG. 2.

FIG. 1 is a perspective view of a display apparatus according to an exemplary embodiment of the present invention. FIG. 2 is a block diagram of a driving unit of the display panel of FIG. 1. FIG. 3 is a detailed block diagram of the grayscale compensating part of FIG. 2.

Referring to FIG. 1, FIG. 2, and FIG. 3, the display apparatus 1 includes a backlight unit 10, a display panel 30, and a driving unit 50 driving the display panel 30. The driving unit 50 includes a gate driving part 400, a data driving part 500, a grayscale compensating part 900, and a control part 600. The control part 600 controls the gate driving part 400, the data driving part 500, and the grayscale compensating part 900.

The display apparatus 1 may further include a driving voltage generating part 700.

The backlight unit 10 may include a light source 110, a light guide plate 130, and a receiving container 150 receiving the light source 110 and the light guide plate 130. The backlight unit 10 is disposed under the display panel 30 and generates light to the display panel 30. The backlight unit 10 may be an edge type backlight unit disposed on side surfaces 131, 132, 133, and 134 of the light guide plate 130.

The light source 110 may include a point light source, for example, a light-emitting diode (LED). The light source 110 may include white LEDs emitting white light. Alternatively, the light source 110 may include red LEDs emitting red light, green LEDs emitting green light, and blue LEDs emitting blue light.

The display panel 30 includes a plurality of pixels P disposed in a matrix shape. Each of the pixels P includes a switching element Q connected to a gate line GL, a data line DL, a liquid crystal capacitor Clc, and a storage capacitor Cst.

The display panel 30 includes a lower substrate 310, an upper substrate 320 and a liquid crystal layer 330 interposed between the lower substrate 310 and the upper substrate 320. The lower substrate 310 may include the switching element Q, the gate lines GL, the data lines DL, and a pixel electrode. The upper substrate 320 may include a black matrix, a color filter, and a common electrode.

The switching element Q may be a thin-film transistor, which may include a gate electrode, a source electrode, and a drain electrode, and a channel layer of, e.g., amorphous silicon or poly silicon. The source electrode may be connected to the data line DL. The gate electrode may be connected to gate line GL, and the drain electrode may be connected to the pixel electrode, the liquid crystal capacitor Clc, and the storage capacitor Cst.

The liquid crystal capacitor Clc may use the pixel electrode connected to the switching element Q and the common electrode opposite to the pixel electrode as both of its capacitive electrodes. Additionally, the liquid crystal capacitor may have a constant capacitance established by the liquid crystal layer 330 disposed between the electrodes as its dielectric substance.

The display panel 30 may be driven as follows. A gate control signal CONT1 may be applied to a specific gate line GL, and a data control signal CONT2 may be applied to a specific data line DL. Then a specific pixel P that corresponds to the specific gate line GL and the specific data line DL may be selected. A thin-film transistor of the specific pixel P may be turned on, thereby generating an electric field between the pixel electrode and the common electrode. Thus, orientations of liquid crystal molecules in the liquid crystal layer 330 and the transmission of light provided by the backlight unit 10 under the display panel 30 may be changed. The light transmitted through the liquid crystal layer 330 may pass through a color filter layer that may include red, green, and blue color filters and may be emitted to an upper surface of the display panel 30. Different colors emitted from each pixel P may be mixed to display a color image.

The driving voltage generating part 700 generates a gate-on voltage Von to turn on the switching element Q, a gate-off voltage Voff to turn off the switching element Q, and a common voltage Vcom provided to the gate driving part 400.

The gate driving part 400 is connected to each of the gate lines GL1, . . . , GLi of the display panel 30 and applies analog signals, including the gate-on voltage Von and the gate-off voltage Voff provided from the driving voltage generating part 700, as gate signals, which may be supplied in sequence, to each of the gate lines GL1, . . . , GLi. Here, "i" is a natural number.

The control part 600 receives image signals R, G, and B and control signals of the image signals R, G, and B provided from an external device such as a graphics controller (not shown). For example, the control signals may include a vertical synchronizing signal Vsync, a horizontal synchronizing signal Hsync, a main clock signal MCLK, and a data enable signal DE. The control part 600 controls the image signals R, G, and B and the control signals to be suitable for diving the display panel 30. The control part 600 then generates and outputs a grayscale signal G(n), the gate control signal CONT1, and the data control signal CONT2. Here, "n" is a natural number.

Figure 4:
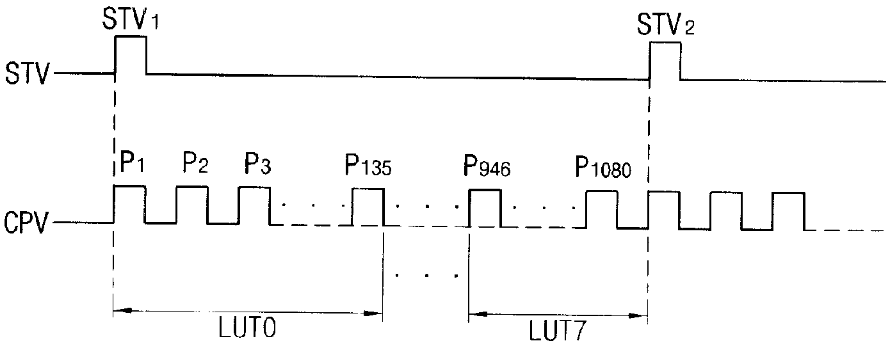
FIG. 4 shows waveforms of a vertical synchronizing start signal and a gate clock signal among control signals of FIG. 2.

As shown by the waveforms in FIG. 4, the gate control signal CONT1 may include a vertical synchronizing start signal STV controlling a start of an output of a gate-on pulse (a high pulse period of the gate signal), a gate clock signal CPV controlling a timing of the output of the gate-on pulse, an output enable signal controlling a width of the gate-on pulse, and so on.

The data control signal CONT2 may include a horizontal synchronizing start signal, a load signal controlling a supply of a data voltage to the data lines DL1, . . . , DLm, a reverse signal reversing a polarity of the data voltage with respect to the common voltage Vcom, a data clock signal, and so on. Here, "m" is a natural number.

The grayscale compensating part 900 outputs a compensating signal D(n) of the grayscale signal G(n) of a present frame using look-up tables that respectively correspond to blocks of the display panel 30. The display panel 30 is divided into a plurality of the blocks according to a distance from the light source 110.

For example, when the light source 110 is disposed adjacent to a first side surface 31 of the display panel 30, the display panel 30 may be divided along a direction substantially parallel with the first side surface 31. Alternatively, when the light source 110 is disposed adjacent to a second side surface 32 of the display panel 30, the display panel 30 may be divided along a direction substantially parallel with the second side surface 32.

Although the grayscale compensating part 900 is separated from the control part 600 in FIG. 2, the grayscale compensating part 900 may be integrally formed with the control part 600. Alternatively, the grayscale compensating part 900 may be integrally formed with the gate driving part 400 or the data driving part 500.

The grayscale compensating part 900 will be described below in detail.

The data driving part 500 is connected to each of the data lines DL1, . . . , DLm of the display panel 30 and converts the compensating signal D(n) of the present frame provided from the grayscale compensating part 900 into a grayscale voltage, which is provided in sequence, as data signals to each of the data lines DL1, . . . , DLm.

FIG. 3 is a detailed block diagram of the grayscale compensating part of FIG. 2.

Referring to FIG. 3, the grayscale compensating part 900 includes a storing part 950, a plurality of look-up tables 910, a selecting part 930, and an output part 970.

The storing part 950 stores a grayscale signal G(n−1) of a previous frame and provides the grayscale signal G(n−1) of the previous frame to the output part 970.

The look-up tables 910 include information on the compensating signal D(n) of the present frame corresponding to the grayscale signal G(n−1) of the previous frame and the grayscale signal G(n) of the present frame to generate an overshoot.

The compensating signal D(n) of the present frame in the look-up tables 910 is set according to the distance from the light source 110 in advance. The look-up tables 910 may be stored in a single memory or may be stored in a plurality of memories.

The selecting part 930 selects look-up tables that correspond to the blocks of the display panel 30 among the look-up tables 910. The selecting part 930 may select the look-up tables in response to the gate control signal CONT1 or the data control signal CONT2.

Alternatively, the selecting part 930 may select the look-up tables in response to a temperature signal provided from outside. The temperature signal may correspond to the blocks of the display panel 30 or to a timing of driving the display panel 30.

The selecting part 930 may include a counter 990 counting the number of pulses of the gate control signal CONT1 or the data control signal CONT2. When the count of counter 990 matches a reference or a predetermined number, the selecting part 930 may change the look-up table.

The output part 970 outputs the compensating signal D(n) of the present frame corresponding to the grayscale signal G(n−1) of the previous frame and the grayscale signal G(n) of the present frame in the look-up table selected by the selecting part 930. The compensating signal D(n) of the present frame is provided to the data driving part 500 as a compensating signal of the grayscale signal G(n) of the present frame for improving a response speed of liquid crystals.

FIG. 4 is a waveform diagram of a vertical synchronizing start signal and a gate clock signal among control signals of FIG. 2. FIG. 5, FIG. 6, FIG. 7, FIG. 8, and FIG. 9 are conceptual diagrams showing the correspondence between various look-up table configurations with respect to blocks of the display panel of FIG. 2.

Hereinafter, in the display panel 300 shown in FIG. 5, FIG. 6, FIG. 7, FIG. 8, and FIG. 9, side surfaces substantially parallel with the gate lines GL are defined by a first side surface 31 and a third side surface 33, and side surfaces substantially parallel with the data lines DL are defined by a second side surface 32 and a fourth side surface 34.

The light source 110 may be disposed on the side surfaces 131, 132, 133, and 134 of the light guide plate 130 disposed under the display panel 30, but, for convenience, the light source 110 will be described as disposed at the side surfaces 31, 32, 33, and 34 of the display panel 300.

Referring to FIG. 4, the gate clock signal CPV is generated with respect to the vertical synchronizing start signal STV, and the total number of pulses of the gate clock signal CPV may be determined according to the resolution of the display panel 30. For example, for an image signal that has a 1920×1080 resolution, the gate clock signal CPV having 1080 pulses $P_1, \ldots, P_{1080}$ is generated with respect to the single vertical synchronizing start signal STV, corresponding to STV1 in FIG. 4.

The selecting part 930 receives the vertical synchronizing start signal STV and the gate clock signal CPV among the gate control signal CONT1, which is output from the control part 600 and received by the gate driving part 400. The counter 990 of the selecting part 930 counts the number of pulses of the gate clock signal CPV.

When the vertical synchronizing start signal STV is applied to the gate driving part 400, the selecting part 930 may select a first look-up table LUT0. Then, the selecting part 930 may change the look-up table when the number of the pulses of the gate clock signal CPV counted by the counter 990 matches the reference or predetermined number.

Figure 5:
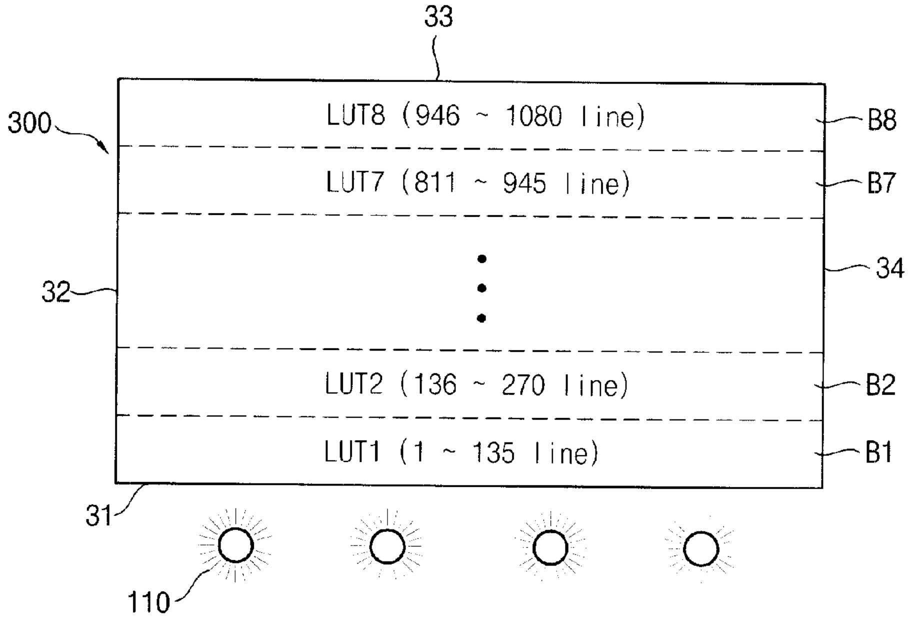
FIG. 5 is a conceptual diagram showing the correspondence between look-up tables and blocks of the display panel of FIG. 2 when a light source is disposed at a first side surface of the display panel.

For example, when the display panel 300 is divided into eight blocks as in FIG. 5, the selecting part 930 may select a different look-up table whenever 135 pulses of the gate clock signal CPV are counted by the counter 990.

FIG. 5 is a conceptual diagram showing an exemplary correspondence between look-up tables and the blocks of the display panel 300 when the light source 110 is disposed at the first side surface 31 of the display panel 300.

The display panel 300 may be divided into a plurality of blocks along a direction substantially parallel with the first side surface 31, which is also substantially parallel to the gate lines GL. The number of the blocks may be determined for individual displays or as applications demand.

Among the blocks of the display panel 300, the maximum temperature of the liquid crystals is likely within a block disposed adjacent to the light source 110, and the temperature of the liquid crystals may decrease for blocks further away from the light source 110. Therefore, the look-up tables 910 containing information that affect the compensating signal D(n) vary according to the position of the blocks within the display panel 300. The information in the look-up tables takes into account the response speed of the liquid crystals based on the temperature variation of the display panel.

Again, when the image signal has a 1920×1080 resolution with the display panel 300 divided into eight blocks, each block includes 135 horizontal lines. In this case, the selecting part 930 may select the look-up tables that correspond to the blocks of the display panel 300 based on a count of the number of pulses of the gate clock signal CPV of FIG. 4.

For example, a first block B1 may include the first to the 135-th horizontal lines may correspond to a first look-up table LUT1, and a second block B2 may include the 136-th to the 270-th horizontal lines and may correspond to a second look-up table LUT2. Similarly, a seventh block B7 may include the 811-th to the 945-th horizontal lines and may correspond to a seventh look-up table LUT7, and an eighth block B8 may include the 946-th to the 1080-th horizontal lines and may correspond to an eighth look-up table LUT8.

Figure 6:
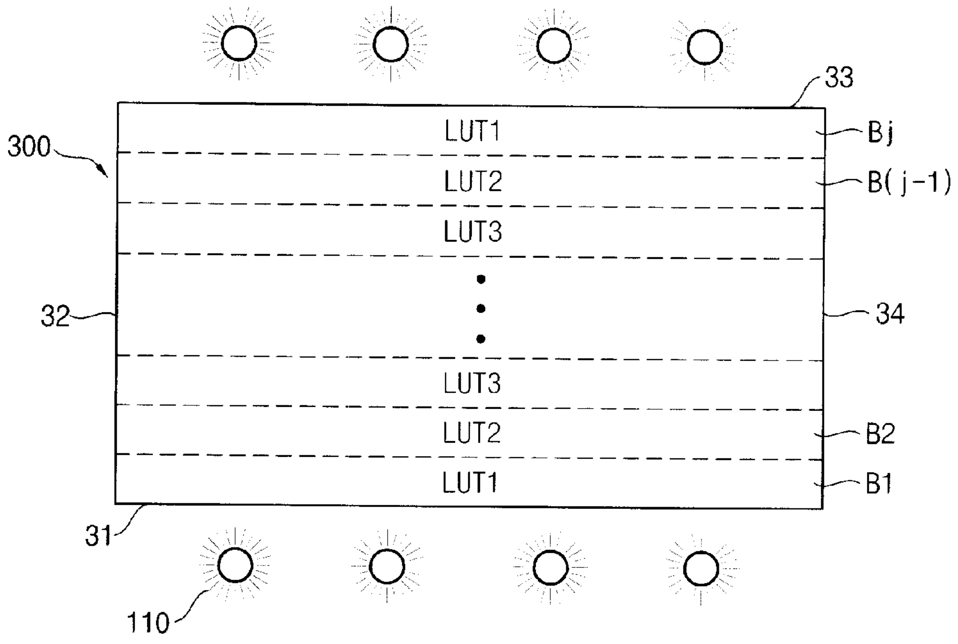
FIG. 6 is a conceptual diagram showing the correspondence between look-up tables and blocks of the display panel of FIG. 2 when a light source is disposed at first and third side surfaces of the display panel.

FIG. 6 is a conceptual diagram showing the correspondence between look-up tables and the blocks of the display panel 300 when the light source 110 is disposed at the first and third side surfaces 31 and 33 of the display panel 300.

The display panel 300 may be divided into j blocks along the direction substantially parallel with the first side surface 31. In this case, the selecting part 930 may select the look-up tables that correspond to the blocks based on a count of the number of the pulses of the gate clock signal CPV of FIG. 4.

For example, the first block B1 disposed adjacent to the first side surface 31 and a j-th block Bj disposed adjacent to the third side surface 33 may correspond to the same first look-up table LUT1. Similarly, a second block B2 and a (j−1)-th block B(j−1) may both correspond to the second look-up table LUT2.

Figure 7:
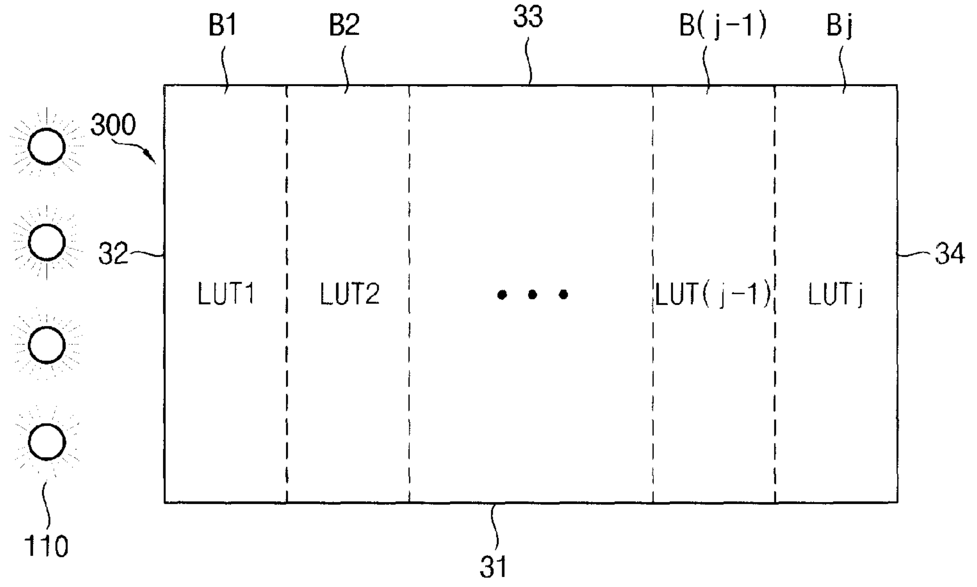
FIG. 7 is a conceptual diagram showing the correspondence between look-up tables and blocks of the display panel of FIG. 2 when a light source is disposed at a second side surface of the display panel.

FIG. 7 is a conceptual diagram showing the correspondence between look-up tables and the blocks of the display panel 300 when the light source 110 is disposed at the second side surface 32 of the display panel 300. The display panel 300 may be divided into j blocks along the direction substantially parallel with the second side surface 32.

When the image signal has a 1920×1080 resolution and the display panel 300 is divided into ten blocks, each block includes 192 vertical lines. In this case, the selecting part 930 may select the look-up tables that correspond to the blocks based on the number of pulses of the data clock signal provided from the control part 600.

For example, a first block B1 disposed adjacent to the second side surface 32 among the blocks of the display panel 300 may correspond to a first look-up table LUT1, and a second block B2 may correspond to a second look-up table LUT2. Similarly, a j-th block Bj may correspond to a j-th look-up table LUTj.

Figure 8:
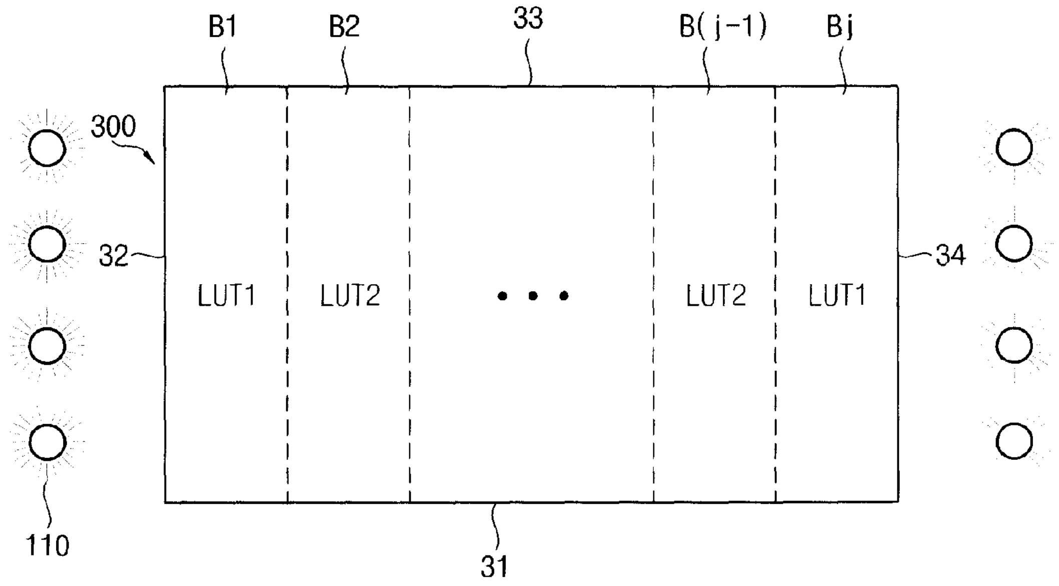
FIG. 8 is a conceptual diagram showing the correspondence between look-up tables and blocks of the display panel of FIG. 2 when a light source is disposed at second and fourth side surfaces of the display panel.

FIG. 8 is a conceptual diagram showing the correspondence between the look-up tables and the blocks of the display panel 300 when the light source 110 is disposed at the second and fourth side surfaces 32 and 34 of the display panel 300.

The display panel 300 may be divided into j blocks along the direction substantially parallel with the second side surface 32. In this case, the selecting part 930 may select the look-up tables respectively corresponding to the blocks based on the number of the pulses of the data clock signal provided from the control part 600.

For example, a first block B1 disposed adjacent to the second side surface 32 and a j-th block Bj disposed adjacent to the fourth side surface 34 among the blocks of the display panel 30 may correspond to the same first look-up table LUT1. Similarly, a second block B2 and a (j−1)-th block B(j−1) may correspond to the second look-up table LUT2.

Figure 9:
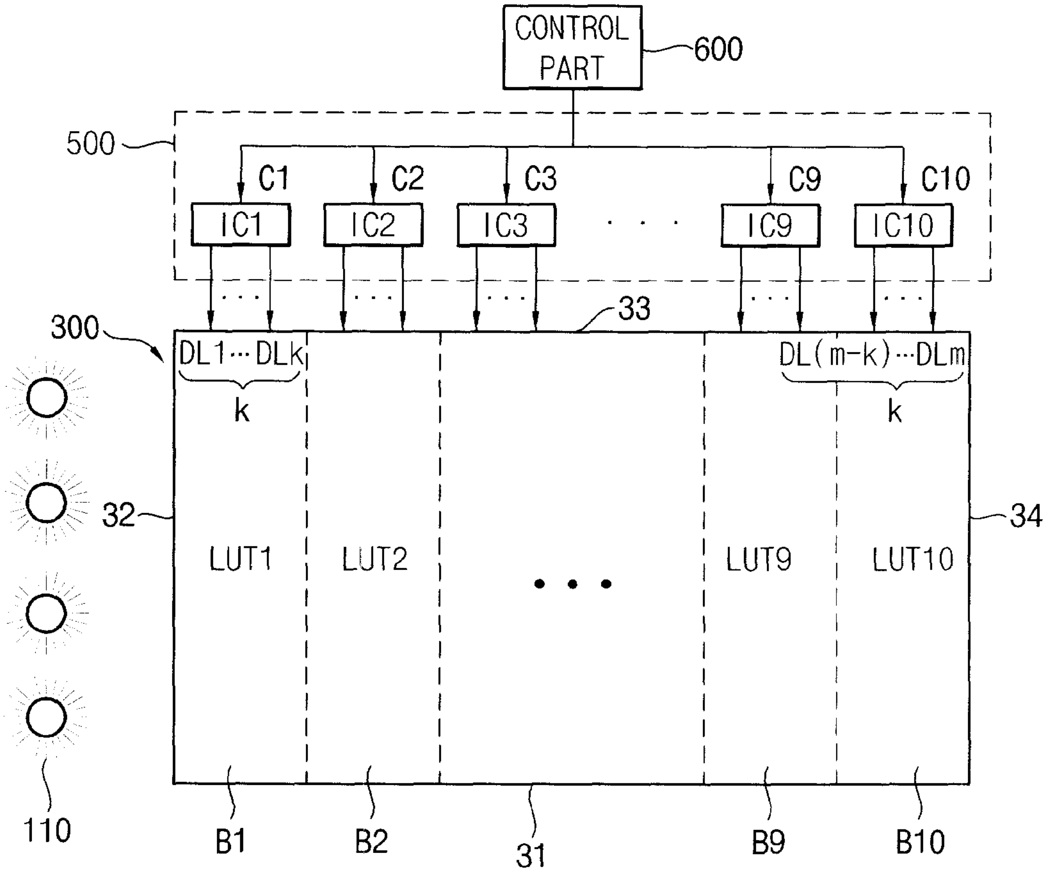
FIG. 9 is a conceptual diagram showing the correspondence between look-up tables and blocks of the display panel of FIG. 2 when a light source is disposed at second or fourth side surface of the display panel.

FIG. 9 is a conceptual diagram showing the correspondence between the look-up tables and the blocks of the display panel 300 when the light source 110 is disposed at the second or fourth side surface 32 or 34 of the display panel 300.

The data driving part 500 may include a plurality of data driving chips. For example, when the data driving part 500 includes first to tenth data driving chips IC1, . . . , IC10, each of the driving chips may be connected to k data lines, where m is 10k. That is, the first data driving chip IC1 may be connected to the first to the k-th data lines $D_{L1}, \ldots, D_{Lk}$, and the tenth data driving chip IC10 may be connected to the (m-k)th to the m-th data lines $D_{L(m-k)}, \ldots, D_{Lm}$.

In this case, the control part 600 provides carry signals C1, . . . , C10 to the first to the tenth data driving chips IC1, . . . , IC10 as the control signals, respectively. The selecting part 930 may select the look-up tables that correspond to the blocks in response to the carry signals C1, . . . , C10 provided to each of the data driving chips IC1, . . . , IC10 from the control part 600.

Alternatively, the control part 600 may output the data control signals CONT2 to ports (not shown) separated from each other, respectively, and may provide a port designating signal to each of the ports as the control signals. The selecting part 930 may select the look-up tables that correspond to the blocks in response to the port designating signals.

The display panel 300 may be divided into a plurality of blocks along the direction substantially parallel with the second side surface 32. The number of blocks of the display panel 300 may be the same as the number of the data driving chips IC1, . . . , IC10.

For example, the light source 110 may be disposed at either the second or the fourth side surfaces 32 or 34 of the display panel 300. In this case, a first block B1 including the first to the k-th data lines DL1, . . . , DLk may correspond to a first look-up table LUT1, and a tenth block B10 including the (m-k)-th to the m-th data lines DL(m-k), . . . , DLm may correspond to a tenth look-up table LUT10.

Alternatively, the light source 110 may be disposed at both of the second and the fourth side surfaces 32 and 34 of the display panel 300. In this case, the first block B1 and the tenth block B10 may correspond to the same first look-up table LUT1.

According to the display apparatus 1, the display panel 30 is divided into numerous blocks according to a position of the light source 110, and the compensating signal D(n) of the grayscale signal G(n) of the present frame is outputted using the look-up tables that correspond to the blocks. Therefore, an imbalance of the response speed due to the temperature gradient along the display panel 30 corresponding to the distance of the blocks from the light source 110 may be reduced so that display quality may be improved.

Figure 10:
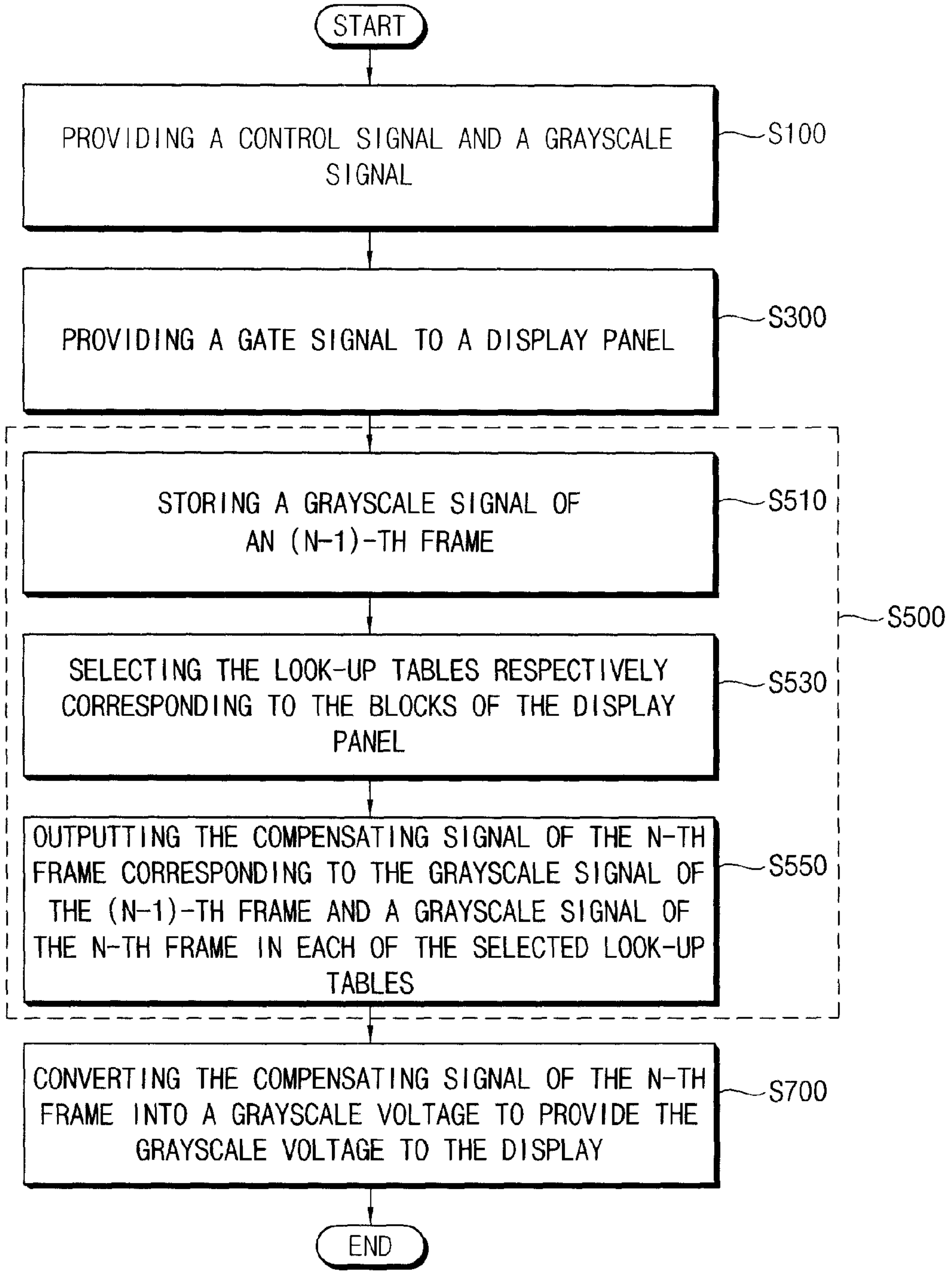
FIG. 10 is a flowchart of a method for driving the display panel of FIG. 1.

FIG. 10 is a flowchart of a method for driving the display panel shown in FIG. 1.

Referring to FIG. 1, FIG. 2, FIG. 3, FIG. 4, FIG. 5, FIG. 6, FIG. 7, FIG. 8, FIG. 9, and FIG. 10, the control part 600 provides the gate control signal CONT1 including the gate clock signal CPV, the data control signal CONT2 including the data clock signal, and the grayscale signal G(n) (step S100).

The gate driving part 400 applies the gate signals to each of the gate lines GL1, . . . , GLi based on the gate control signal CONT1 including the gate clock signal CPV in sequence (step S300).

The grayscale compensating part 900 outputs the compensating signal D(n) of the grayscale signal G(n) of the present frame using the look-up tables that correspond to the blocks of the display panel 30 (step S500).

The display panel 30 is divided into the plurality of the blocks according to the distance from the light source 110. For example, when the light source 110 is disposed adjacent to the first side surface 31 of the display panel 30, the display panel 30 may be divided along the direction substantially parallel with the first side surface 31. Alternatively, when the light source 110 is disposed adjacent to the second side surface 32 of the display panel 30, the display panel 30 may be divided along the direction substantially parallel with the second side surface 32.

In the step S500, the storing part 950 stores the grayscale signal G(n−1) of the previous frame (step S510). Then, the selecting part 930 selects the look-up tables respectively corresponding to the blocks of the display panel 30 (step S530).

The look-up tables 910 include information on the compensating signal D(n) of the present frame corresponding to the grayscale signal G(n−1) of the previous frame and the grayscale signal G(n) of the present frame to generate the overshoot.

The selecting part 930 may select the look-up tables respectively corresponding to the blocks of the display panel 30 in response to the gate control signal CONT1 or the data control signal CONT2. The selecting part 930 may include the counter 990 to count the number of the pulses of the gate control signal CONT1 or the data control signal CONT2.

When the counter 990 counts a certain number, which may be predetermined or may be a reference number, of the pulses of the gate control signal CONT1 or the data control signal CONT2, the selecting part 930 may change the look-up table. For example, the gate control signal CONT1 or the data control signal CONT2 may be at least one of the gate clock signal CPV, the data clock signal, the carry signals C1, . . . , C10 provided to the data driving chips IC1, . . . , IC10, and the port designating signal provided to each of the ports.

Alternatively, the selecting part 930 may select the look-up tables in response to the temperature signal provided from outside. The temperature signal may correspond to the blocks of the display panel 30. Alternatively, the temperature signal may correlate to the timing of driving the display panel 30.

The output part 970 outputs the compensating signal D(n) of the present frame corresponding to the grayscale signal G(n−1) of the previous frame and the grayscale signal G(n) of the present frame in the look-up table selected by the selecting part 930 (step S550).

The compensating signal D(n) of the present frame is provided to the data driving part 500 as the compensating signal of the grayscale signal G(n) of the present frame for improving the response speed of the liquid crystals. The data driving part 500 converts the compensating signal D(n) of the present frame into the grayscale voltage and provides the grayscale voltage as the data signals to each of the data lines DL1, . . . , DLm, in sequence (step S700).

According to the method of driving the display panel, the look-up tables respectively corresponding to the blocks of the display panel 30 are selected so that the compensating signal D(n) of the grayscale signal G(n) of the present frame may be output. Therefore, the imbalance of the response speed according to the distance between positions of the display panel 30 and the light source 110 may be reduced so that the display quality may be improved.

According to the present invention, the look-up tables respectively corresponding to the blocks of the display panel are selected according to the distance from the light source so that the imbalance of the response speed according to the temperature variation of the liquid crystals may be decreased, and the display quality may be improved.

The foregoing is illustrative of the present invention and is not to be construed as limited to the exemplary embodiments disclosed.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of driving a display panel, comprising:

providing a control signal and a grayscale signal, the control signal comprising a gate clock signal and a data clock signal;

providing a gate signal to the display panel based on the gate clock signal;

dividing the display panel into blocks according to distance from a light source to each of the blocks;

outputting a compensating signal of an n-th frame using look-up tables, the look-up tables respectively corresponding to the blocks of the display panel, and "n" being a natural number; and converting the compensating signal of the n-th frame into a grayscale voltage and providing the grayscale voltages to each corresponding block of the display panel.

2. The method of claim 1, wherein outputting the compensating signal of the n-th frame comprises:

storing a grayscale signal of an (n−1)-th frame;

selecting the look-up tables respectively corresponding to the blocks of the display panel; and outputting the compensating signal of the n-th frame corresponding to the grayscale signal of the (n−1)-th frame and a grayscale signal of the n-th frame in each of the selected look-up tables.

3. The method of claim 2, wherein the look-up tables respectively corresponding to the blocks of the display panel are selected in response to the control signal.

4. The method of claim 2, wherein selecting the look-up tables respectively corresponding to the blocks of the display panel comprises:

counting a number of pulses of the gate clock signal, wherein the look-up tables are selected according to the number of the pulses of the gate clock signal.

5. The method of claim 2, wherein selecting the look-up tables respectively corresponding to the blocks of the display panel comprises:

counting a number of pulses of the data clock signal, wherein the look-up tables are selected according to the number of pulses of the data clock signal.

6. The method of claim 2, wherein the control signal further comprises a carry signal provided to a plurality of data driving chips, and the look-up tables respectively corresponding to the blocks of the display panel are selected in response to the carry signal.

7. The method of claim 2, wherein the control signal further comprises a port designating signal designating a port through which the data clock signal is outputted, and the look-up tables respectively corresponding to the blocks of the display panel are selected in response to the port designating signal.

8. The method of claim 2, wherein the look-up tables respectively corresponding to the blocks of the display panel are selected in response to a temperature signal of the display panel.

9. A driving unit of a display panel, the panel being divided into a plurality of blocks according to distance from a light source to each of the blocks, the driving unit comprising:

a control part to provide a control signal and a grayscale signal, the control signal comprising a gate clock signal and a data clock signal;

a gate driving part to provide a gate signal to the display panel based on the gate clock signal;

a grayscale compensating part to output compensating signals of an n-th frame using look-up tables, the look-up tables respectively corresponding to the blocks of the display panel, and "n" being a natural number; and a data driving part to convert the compensating signal of the n-th frame into grayscale voltages and to provide the grayscale voltages to each corresponding block of the display panel.

10. The driving unit of claim 9, wherein the grayscale compensating part comprises:

a storing part to store a grayscale signal of an (n−1)-th frame;

a plurality of look-up tables comprising information on the compensating signals of the n-th frame corresponding to the grayscale signals of the (n−1)-th frame and grayscale signals of the n-th frame;

a selecting part to select the look-up tables respectively corresponding to the blocks of the display panel; and an output part to output the compensating signals of the n-th frame using each of the selected look-up tables.

11. The driving unit of claim 10, wherein the selecting part selects the look-up tables in response to the control signal.

12. A display apparatus, comprising:

a light source to generate light;

a display panel to receive the light and comprising gate lines and data lines crossing each other, the display panel being divided into a plurality of blocks according to distance from the light source to each of the blocks;

a control part to provide a control signal and a grayscale signal, the control signal comprising a gate clock signal and a data clock signal;

a gate driving part to provide a gate signal to the gate lines based on the gate clock signal;

a grayscale compensating part to output a compensating signal of an n-th frame using look-up tables, the look-up tables respectively corresponding to the blocks of the display panel, and "n" being a natural number; and a data driving part to convert the compensating signal of the n-th frame into a grayscale voltages and to provide the grayscale voltages to the data lines corresponding to each block of the display panel.

13. The display apparatus of claim 12, wherein the grayscale compensating part comprises:

a storing part to store a grayscale signal of an (n−1)-th frame;

a plurality of look-up tables comprising information on the compensating signal of the n-th frame corresponding to the grayscale signal of the (n−1)-th frame and a grayscale signal of the n-th frame;

a selecting part to select the look-up tables respectively corresponding to the blocks of the display panel; and an output part to output the compensating signal of the n-th frame using each of the selected look-up tables.

14. The display apparatus of claim 13, wherein the selecting part selects the look-up tables in response to the control signal.

15. The display apparatus of claim 14, wherein the selecting part comprises a counter to count a number of pulses of the control signal.

16. The display apparatus of claim 15, wherein the light source is disposed adjacent to a side surface of the display panel substantially parallel with the gate lines, and the selecting part selects the look-up tables according to the number of pulses of the gate clock signal.

17. The display apparatus of claim 15, wherein the light source is disposed adjacent to a side surface of the display panel substantially parallel with the data lines, and the selecting part selects the look-up tables according to the number of pulses of the data clock signal.

18. The display apparatus of claim 14, wherein the data driving part comprises a plurality of data driving chips, the control signal further comprises a carry signal provided to the data driving chips, and the selecting part selects the look-up tables in response to the carry signal.

19. The display apparatus of claim 14, wherein the control signal further comprises a port designating signal designating a port through which the data clock signal is outputted, and the selecting part selects the look-up tables in response to the port designating signal.

20. The display apparatus of claim 13, wherein the selecting part selects the look-up tables in response to a temperature signal of the display panel.

* * * * *